Sept. 25, 1956     C. G. SILVERBERG     2,764,491
REFRACTORIES
Filed April 28, 1951
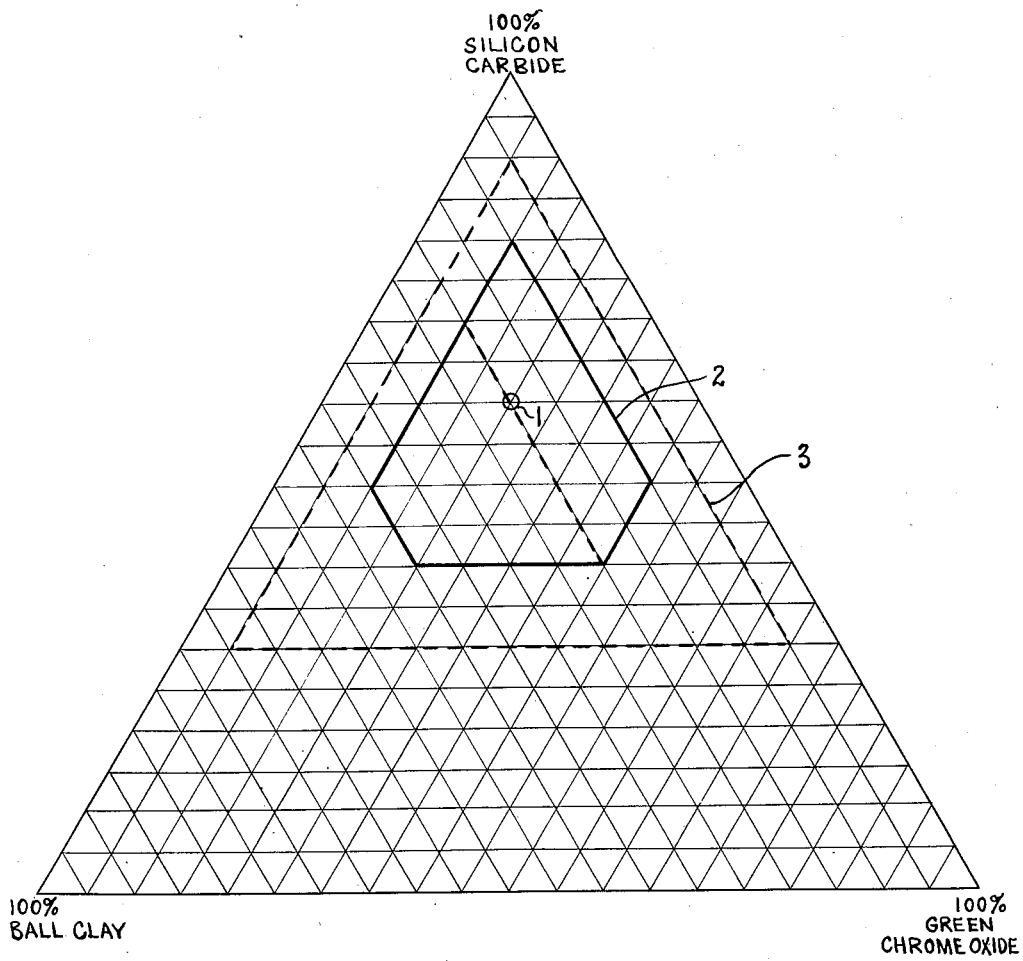
INVENTOR
CARL G. SILVERBERG
BY
ATTORNEY

United States Patent Office 2,764,491
Patented Sept. 25, 1956

2,764,491

REFRACTORIES

Carl G. Silverberg, Sturbridge, Mass., assignor to American Optical Company, Southbridge, Mass., a voluntary association of Massachusetts Application April 28, 1951, Serial No. 223,518

3 Claims. (Cl. 106—44)

This invention relates to refractories and has particular reference to refractories for supporting glass articles when shaping, fusing, or otherwise treating said articles by heat methods.

The use of glasses containing lead is becoming more and more desirable not only in the manufacture of transparent shields for stray X-rays, such, for example, as from X-ray machines but also in the forming of lenses, corrector plates or the like for use in optical systems wherein X-rays may be present.

Such lenses, corrector plates or the like are in most instances relatively large and are formed with surface shapes which are so controlled as to introduce desirable optical characteristics. In many instances these surfaces are difficult, if not impossible, to form by commonly known glass surfacing methods.

One of the most desirable methods employed in forming such large lenses or corrector plates is what is known in the art as a dropping technique which embodies the use of a refractory having on its supporting surface a controlled shape which is such as to produce the shape of surface desired on the article. This is brought about by supporting a blank of lead-containing glass on the surface of the refractory and subjecting it to heat of a temperature sufficient to cause the glass to soften and assume the shape of the refractory surface.

It has been found, however, that with known prior art refractories considerable difficulty has been encountered in having the glass adhered to the surface of the refractory coincident with the dropping operation, with the result that the optical characteristics of the dropped article would be changed from that desired or the resultant article would break when an attempt was made to remove it from the refractory.

The above was particularly true when silicon carbide refractories of the prior art type were used. With such refractories, in order to obviate the tendencies toward adhesion, the supporting surface was treated as by dusting with clay or graphite prior to placing the glass blank thereon for dropping. This practice, however, has been found to be impractical when forming lenses or corrector plates of the above character because the particles of the dusting material present on the supporting surface of the refractory introduced surface distortions and destroyed the high precision optics desired of the final product.

Prior art also refers to a refractory such as taught by Patent No. 2,440,187, issued April 20, 1948, to the present inventor which deals with obviating the tendency of glass to adhere to the refractory by forming the refractory predominantly of a high alumina mineral mixed with a bond clay as a binder and having a colorant therein for introducing desired infra-red absorbing characteristics. Although these proved highly successful when dropping articles formed of crown or non-lead-containing glass and did prevent the adhesion of the glass thereto during the dropping process, they were found to be unsuitable for use in forming articles of lead-containing glass.

It, therefore, is one of the principal objects of this invention to provide a refractory for supporting and forming lead-containing glass articles by the heating and dropping process whereby the said refractory will obviate any tendency of the articles to adhere thereto during said heating operation and in addition will possess desired characteristics as to heat conductivity and expansion whereby the said refractories may be employed in repetitive heating and dropping of a plurality of articles of consistently similar shapes and optical characteristics and without reworking the surface of the refractory.

Another object is to provide a refractory of the above character which inherently possesses controlled porosity and permeability for enabling the article to more accurately and quickly conform to the surface shape of the refractory and for more positively controlling the distribution of heat during the use of the refractory whereby a glass article supported upon the refractory will be more uniformly heated and formed than has been heretofore possible.

A still further object is to provide a refractory having heat conductive characteristics which will enable glass articles of a relatively large size to be accurately dropped to shape within relatively short heating cycles.

A still further object is to provide a refractory of the above character whereby the surface shapes of the dropped or heated articles may be more positively controlled during said heating so that the resultant surface of the article will be more optically accurate than has hereto been possible to obtain.

Other objects and advantages of the invention will become apparent from the following description taken in connection with the accompanying drawing in which:

The figure of the drawing is a basic composition diagram illustrating the complete range of acceptable compositions for forming refractories in accordance with this invention.

Although it has been stated above that refractories formed of silicon carbide as made in accordance with the prior art have proven unsatisfactory for use in dropping glass articles due to the tendency of the glass to adhere thereto, it has been found that silicon carbide aids in the uniform distribution of heat and possesses to some extent relatively stable expansion characteristics. Such refractories, as formed by the prior art, however, were discarded because of the tendency of the glass to adhere thereto and were replaced by refractories formed of a composition as set forth in the above mentioned patent.

When articles formed of glass containing lead and of a relatively large area, however, were attempted to be dropped on refractories such as taught by the above mentioned patent, it was found that such glass not only would adhere thereto but difficulty was also encountered in that the heat would not always become uniformly dispersed throughout the refractory with the result that the article being dropped became distorted and would not assume the shape desired.

The present invention is directed to retaining the desired uniformity of distribution of heat and the stability of the expansion curve characteristics of the silicon carbide type of a refractory while obviating the tendency of the lead glasses as well as any of the other of the commonly used glasses from adhering thereto.

In accordance with this invention, a refractory suitable for these purposes and to which the lead-containing glass will not adhere can be produced by forming a composition, using, as a major ingredient, silicon carbide having a clay combined therewith. Silicon carbide has initially dry characteristics whereby it may be easily made into powder form and when mixed with water can be shaped substantially as desired. It has, however, been found that the addition of plastic clay of a type which will not introduce vitrification may be added as a binder to greatly facilitate the fabrication of refractories.

To this composition is added a controlled amount of chrome oxide, rouge, manganese dioxide or other known colorant which does not produce vitrification. The preferred ingredient is chrome oxide.

The colorant is used to accomplish a two-fold purpose; first it is believed that the colorant aids in preventing adhesion of the glass to the resultant refractory and, secondly, the colorant more uniformly controls the dispersion of heat throughout the article being supported and also throughout the refractory itself. Thus, by controlling the amount of colorant used, the resultant refractory can be made to possess controlled porosity and permeability. These colorants are also infra-red absorbing materials which during the heating of the article being supported tends to more readily absorb the heat and provides for more uniform heating of the refractory.

The use of controlled amounts of green chrome oxide as the selected colorant is preferred since it has been found that when the refractories are to be used repetitively, refractories containing green chrome oxide produce much more satisfactory results, as to the retention of their infra-red absorbing and expansion and contraction characteristics.

In forming refractories in accordance with these teachings, the addition of ammonium oxalate to the above ingredients introduces greater ease of fabrication. However, when using ammonium oxalate as a dispersing agent, the resultant composition has been found to be somewhat acid. Therefore, to adjust the alkalinity of the composition, a controlled amount of concentrated ammonium hydroxide solution is added thereto. The ammonium oxalate is added in amounts of approximately .3%, with the ammonium hydroxide solution being added in amounts necessary to adjust the pH (alkalinity) between 7.4 and 7.6.

To further stabilize the dispersion of the ingredients of the composition previously set forth, a small amount of triethanolamine may be added. This, of course, depends upon the method of fabrication of the refractory and will provide additional dispersive characteristics. To reduce the compound to a more fluid state water may be added. The amount of water to be used will be determined by the method of fabrication employed.

A preferred composition is as follows:

Table A

| | Grams |
|---|---|
| Silicon carbide | 3200 |
| Ball clay | 800 |
| Ammonium oxalate | 8 |
| Ammonium hydroxide | ½ |
| Triethanolamine | 2 |
| Water | 1000 |

The above formula produces a fluid composition which is particularly suitable for use in forming refractory articles by casting methods.

Although the preferred composition has been found to be substantially that set forth in Table A, it is to be understood that the amount of ball clay may be varied from 5% to 40% of the total composition. Silicon carbide has a tendency to shrink on heating during the fabrication thereof, which characteristic also is true of ball clay so that allowance must be made during drying and firing of the refractories being formed. It has been found that by making the refractories initially larger by an amount sufficient to compensate for the shrinking, the resultant articles may be formed to the final shape and size desired.

The amount of dispersing agents used must be maintained at a minimum to avoid vitrification of the refractory ingredients which might result from a reducing atmosphere and to prevent flux and possible adhesion characteristics in the resultant refractory whereby glass articles subsequently dropped thereon will not adhere to said refractory. The amount of ammonium oxalate and ammonium hydroxide solution used therefor should be only that which is sufficient to bring about the desirable working characteristics without adhesion. Although ammonium oxalate and ammonium hydroxide have been set forth as the preferred dispersing agents, it is to be understood that either or both of said materials may be replaced by one or more of the following ingredients: sodium silicate, sodium carbonate, morpholine, lignin, sodium gallate, etc., or tannic acid or any other known dispersing agent or agents.

With proper temperature and time controls, a refractory formed of the above material or compositions will produce very satisfactory results with no danger of adhesion of glass material of the article being dropped to the refractory during the heating operation.

Referring to the drawing, a preferred composition is shown on the basic composition diagram at 1 and comprises 60% of silicon carbide, 20% of green chrome oxide and 20% of ball clay. However, any composition falling within the area indicated by numeral 2 will prove very satisfactory and should contain from 40% to 80% of silicon carbide, from 10% to 40% of green chrome oxide and from 10% to 40% of ball clay. The extreme upper and lower limits for production of a satisfactory composition are indicated by the space within area 3 wherein silicon carbide content must be held to from 30% to 90%, green chrome oxide should be held to from 5% to 65% and ball clay from 5% to 65%.

One of the preferred methods of forming the composition is as follows: First, dissolve one or more of the dispersing agents set forth above in the required amount of water. Then, add ball clay of the amount required depending upon the amount of silicon carbide to be used. After stirring the mixture thoroughly, the required amount of green chrome oxide or other selected color is then placed in the mixture and the mixture is again thoroughly stirred. Following this the silicon carbide is then added preferably while mixing as fast as the mixture will disperse the silicon carbide without forming lumps. The resultant mixture should preferably be fairly smooth. To this mixture then may be preferably but not necessarily added a small amount of triethanolamine as an emulsifier. The mixture resulting from the combining of the above ingredients is then preferably milled in a suitable ball mill or the like for a period of 20 to 80 hours to reduce aggregates and eliminate air bubbles, and is then ready for use.

Another preferred composition is substantially as follows:

Table B

| | | |
|---|---|---|
| Silicon carbide | grams | 2400 |
| Ball clay | do | 800 |
| Green chrome oxide | do | 800 |
| Ammonium oxalate | do | 8 |
| Ammonium hydroxide | do | ½ |
| Triethanolamine | ccs | 2 |
| Water | grams | 1000 |

A composition formed in accordance with the foregoing description may be molded, cast, or otherwise formed to the desired shape, the resultant refractories produced thereby being efficient whether made in large or small sizes, since even in large sizes heat will be substantially uniformly applied to the glass due to the porosity and inherent heat conductivity of the refractories.

It is important to note that the silicon carbide may be used in substantially any mesh size with 220 being preferred. The resultant articles will have a porosity of approximately 26% and permeability of approximately 1.3 ml. per sq. cm. per minute per millimeter of thickness.

The means and methods employed in forming refractories from compositions of the above character are clearly shown and described in the aforementioned U. S. Patent No. 2,440,187. However, to briefly describe this procedure, a suitable amount of fluid composition is poured into a recess formed in a porous mold member shaped to receive the composition. Due to the porosity of the mold member, a certain amount of the water in the composition is absorbed by the porous material. This causes a superficial hardening of the composition throughout its surfaces adjoining the surfaces of the mold member. After removal of excess material, the fluid which has reached the solid state is then removed, thus forming a hollow refractory. Further hardening or drying of the refractory will cause the material of the composition to contract whereby the resultant refractory may be easily removed from the mold. This is a simple form of slip molding and is used, as an example, when forming refractories where only shape of surface is desired.

Upon removal of the shaped refractories from the molds, they are preferably initially placed within a furnace which is fired at a temperature sufficient to slowly remove all of the free water which might be present. The drying operation may be accomplished at temperatures which are below the temperature which will cause disintegration of the refractories but care must be taken that the drying takes place substantially uniformly throughout the refractories. The dried refractories must thereafter be fired at higher temperatures to prevent their disintegration when placed in water. This is accomplished by increasing the temperature of the heat in the furnace after the drying operation has been completed. The firing schedule for a small furnace is substantially as follows:

Table C

Room temperature to 400° F. by raising temperature 100° F. per hour then 200° F. per hour to 800° F. and finally 400° F. per hour to 2300° F.

The time-temperature cycles involved in the firing and drying may be varied in accordance with the size of furnace used. The firing is for the purpose of bringing about a positive bond between the particles of the composition, tending to produce a refractory having the desired supporting characteristics, porosity and permeability.

The upper temperature limit must be such, however, as to avoid vitrification or the formation of any glassy phase in the refractory.

From the foregoing description it will be seen that simple, efficient and economical means have been provided for accomplishing all of the objects and advantages of the invention by combining silicon dioxide with ball clay and green chrome oxide or other selected colorant to produce a refractory to which glass articles such as those formed of lead-containing glass will not adhere at temperatures sufficient to soften the glass.

It will be apparent that many changes may be made in the details as shown and described without departing from the spirit of the invention. I, therefore, do not wish to be limited to the exact details shown and described as the preferred only have been given by way of illustration.

I claim:

1. A refractory for use in heat dropping a glass article, said refractory being substantially non-adhesive to the glass in the presence of heat sufficient to soften the glass and comprising a body portion that is substantially free of glassy phase and consists essentially of approximately from 30% to 90% by weight of silicon carbide, approximately from 5% to 65% by weight of green chrome oxide, and approximately from 5% to 65% by weight of ball clay, said ingredients being heat joined with each other at a temperature substantially above the softening point of the glass article.

2. A refractory for use in heat dropping a glass article, said refractory being substantially non-adhesive to the glass in the presence of heat sufficient to soften the glass and comprising a body portion that is substantially free of glassy phase and consists essentially of approximately from 40% to 80% by weight of silicon carbide, approximately from 10% to 40% by weight of green chrome oxide, and approximately from 10% to 40% by weight of ball clay, said ingredients being heat joined with each other at a temperature substantially above the softening point of the glass article.

3. A refractory for use in heat dropping a glass article, said refractory being substantially non-adhesive to the glass in the presence of heat sufficient to soften the glass and comprising a body portion that is substantially free of glassy phase and consists essentially of approximately 60% by weight of silicon carbide, approximately 20% by weight of green chrome oxide, and approximately 20% by weight of ball clay, said ingredients being heat joined with each other at a temperature substantially above the softening point of the glass article.

References Cited in the file of this patent

UNITED STATES PATENTS

| 2,272,038 | Morgan | Feb. 3, 1942 |

FOREIGN PATENTS

| 481,230 | France | 1916 |